United States Patent
Voelz et al.

(10) Patent No.: US 11,386,783 B2
(45) Date of Patent: Jul. 12, 2022

(54) GUIDING DEVICE FOR AT LEAST ONE VEHICLE

(71) Applicant: Robert Bosch GmbH, Stuttgart (DE)

(72) Inventors: Benjamin Voelz, Leonberg (DE); Matthias Maier, Weissach (DE); Matthias Haug, Renningen (DE); Michael Gabb, Gaeufelden (DE); Ruediger-Walter Henn, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 16/700,299

(22) Filed: Dec. 2, 2019

(65) Prior Publication Data
US 2020/0175862 A1 Jun. 4, 2020

(30) Foreign Application Priority Data
Dec. 3, 2018 (DE) .................... 102018220775.5

(51) Int. Cl.
| | |
|---|---|
| G08G 1/09 | (2006.01) |
| G08G 1/01 | (2006.01) |
| G05D 1/02 | (2020.01) |
| B60W 50/14 | (2020.01) |
| G08G 1/0968 | (2006.01) |
| B60W 50/00 | (2006.01) |

(52) U.S. Cl.
CPC .......... *G08G 1/0968* (2013.01); *B60W 50/14* (2013.01); *G05D 1/0212* (2013.01); *G08G 1/012* (2013.01); *B60W 2050/0075* (2013.01); *B60W 2050/146* (2013.01); *B60W 2556/45* (2020.02); *B60W 2556/50* (2020.02); *B60W 2756/10* (2020.02)

(58) Field of Classification Search
CPC ................ G08G 1/0968; G08G 1/012; G08G 1/096822; G08G 1/096861; G08G 1/0969; G08G 1/0116; G08G 1/04; G08G 1/0145; G08G 1/096708; G08G 1/096725; G08G 1/01; G08G 1/166; G05D 1/0212; G05D 2201/0213; G05D 1/0297; B60W 50/14; B60W 2556/50; B60W 2756/10; B60W 2050/146; B60W 2050/0077; B60W 2556/45; B60W 30/08; B60W 30/0953
See application file for complete search history.

(56) References Cited

U.S. PATENT DOCUMENTS

| | | | |
|---|---|---|---|
| 10,599,546 B1 * | 3/2020 | Walther | .............. G06F 11/3013 |
| 2010/0161128 A1 * | 6/2010 | Choi | ...................... G08G 1/142 |
| | | | 700/258 |
| 2017/0123422 A1 * | 5/2017 | Kentley | .................. B60L 15/20 |

(Continued)

FOREIGN PATENT DOCUMENTS

| | | |
|---|---|---|
| DE | 102012215447 A1 | 3/2014 |
| DE | 102016113903 A1 | 3/2017 |
| JP | 2017211301 A * 11/2017 | ...... B60W 30/18163 |

*Primary Examiner* — Rodney A Butler
(74) *Attorney, Agent, or Firm* — Norton Rose Fulbright US LLP; Gerard Messina

(57) ABSTRACT

A guiding device for at least one vehicle, including a receiving unit of an infrastructure sensor unit for receiving data of a surroundings of the vehicle and for receiving data of a destination of the vehicle; and an ascertainment unit, the ascertainment unit being designed to ascertain a trajectory from the data of the surroundings and the data of the destination and to transmit the data wirelessly to the vehicle.

7 Claims, 2 Drawing Sheets

(56) References Cited

U.S. PATENT DOCUMENTS

2018/0292834 A1\* 10/2018 Kindo .................. B60W 50/14
2019/0126934 A1\* 5/2019 Wellborn ................ H04W 4/44
2022/0005291 A1\* 1/2022 Konrardy .............. G07C 5/008

\* cited by examiner

GUIDING DEVICE FOR AT LEAST ONE VEHICLE

CROSS REFERENCE

The present application claims the benefit under 35 U.S.C. § 119 of German Patent Application No. DE 102018220775.5 filed on Dec. 3, 2018, which is expressly incorporated herein in its entirety.

FIELD

The present invention relates to a guiding device for at least one vehicle. The present invention furthermore relates to a guiding unit for a vehicle. The present invention furthermore relates to a method for guiding at least one vehicle. The present invention furthermore relates to a computer program product.

BACKGROUND INFORMATION

Infrastructure-sensor-based monitoring systems are available in the related art. Furthermore, traffic management systems based on displays are available in the related art.

Furthermore, in conventional approaches, for the purposes of maneuver planning, a distribution of possible trajectories of other vehicles are taken into consideration in the host vehicle's own maneuver planning, for example, as described in German Patent Application No. DE 10 2016 113 903 A1.

SUMMARY

It is an object of the present invention to provide a device for improved guiding of vehicles.

The object may be achieved according to a first aspect of the present invention by a guiding device for at least one vehicle, including:
- a receiving unit of an infrastructure sensor unit for receiving data of a surroundings of the vehicle and for receiving data of a destination of the vehicle; and
- an ascertainment unit, the ascertainment unit being designed to ascertain a trajectory from the data of the surroundings and the data of the destination and to transmit the data wirelessly to the vehicle.

The object may be achieved according to a second aspect of the present invention by a guiding unit of a vehicle, including:
- a receiving unit for wirelessly receiving data of a guiding device, which ascertains a trajectory on the basis of surroundings data and destination data; and
- a display unit for displaying the trajectory.

An expanded field of view is, thus, implemented for the vehicle. A trajectory may be shown by the connection to the provided guiding device (for example, via mobile radio, WLAN, etc.) and traffic management of the vehicle may thus be optimized.

The object may also be achieved according to a third aspect of the present invention, by a method for guiding at least one vehicle, including the following steps:
- transmitting a destination to a guiding device;
- acquiring a surroundings with the aid of an infrastructure sensor unit;
- ascertaining a trajectory from the destination and the acquired surroundings data; and
- transmitting the trajectory data to a guiding unit for guiding the vehicle.

As a result, a server-based system for guiding traffic flows is thus provided. A homogeneous traffic flow may thus be achieved, whereby, for example, emissions of the vehicles are advantageously minimized. As a result, a more efficient traffic pattern is supported.

Advantageous refinements of the guiding device, the guiding unit, and the method are described herein.

One advantageous refinement of the guiding device in accordance with the present invention provides that the ascertainment unit includes the following:
- a recognition unit;
- a prediction unit for predicting movements of objects of the surroundings model; and
- a planning unit for planning the trajectory of the vehicle.

As a result, a surroundings model that is as accurately detailed as possible may be prepared, from which the trajectories are ascertained.

Another advantageous refinement of the guiding device according to the present invention provides that the wireless transmission may be carried out using a defined latency time. Thus, very short latency times may be achieved with the aid of for example, suitable communication technologies, for example, 5G mobile radio, which supports a high real-time capability of the system.

Another advantageous refinement of the guiding device according to the present invention provides that pieces of information about the surroundings are transmittable to the guiding device with the aid of an information unit. In this way, for example, useful pieces of additional information, for example, data with respect to construction sites, traffic disruptions, pieces of weather information, etc., may be communicated to the guiding device, whereby the surroundings model may be prepared even more accurately.

One advantageous refinement of the guiding unit according to the present invention provides that it furthermore includes a control unit for the driving implementation of the trajectory by driving technology. The trajectory transmitted from the guiding device may thus advantageously also be implemented by driving technology in the case of an automated vehicle.

One advantageous refinement of the method according to the present invention provides that parameters of the vehicle are transmitted to the guiding device. Thus, for example, parameters with respect to driving dynamics of the vehicle may be ascertained at the guiding device, whereby the guiding device takes these mentioned parameters into consideration in a suitable manner during the computation of the trajectory. A higher level of driving comfort of the vehicle may be provided for the driver in this way.

The present invention is described in further detail hereafter with further features and advantages on the basis of multiple figures. All features which are described or shown form the subject matter of the present invention as such or in any arbitrary combination, irrespective of their formulation and representation in the description or in the figures, respectively.

Disclosed features and advantages of the guiding device and the guiding unit result similarly from disclosed features and advantages of the method and vice versa.

DETAILED DESCRIPTION OF EXAMPLE EMBODIMENTS

One main aspect of the present invention is in particular to provide an improved method and a device for guiding at least one vehicle.

An optimum configuration of the traffic flow in a local traffic space is achieved using the provided server-based traffic management systems, for example, in urban surroundings, which are accordingly equipped with infrastructure sensors, communication units, and server capacities. The following optimization criteria thus advantageously result:
- efficiency of the traffic flows, for example, by avoiding traffic jams, bypassing construction sites, taking lane closures into consideration, etc.;
- safety of the traffic, in particular by checking trajectories of the road users for consistency;
- comfort of vehicle occupants, in particular by forming dynamic requirements for the automated vehicles according to comfort requirements of the occupants.

In complex urban traffic situations (for example, megacities), traffic flows may be globally optimized and thus efficiently configured using the provided traffic management system. Consistent dynamic requirements are transmitted to the vehicles located in the local surroundings, so that competing paths for the vehicles do not result. In this way, critical traffic situations and/or accidents may advantageously be avoided, to the greatest possible extent.

The movement planning and implementation may be made comfortable or sporty depending on the desire of the occupants of an automated vehicle.

A vehicle is understood hereafter as a manually controlled, a partially automated, or a fully automated (autonomous) vehicle.

Figure 1:
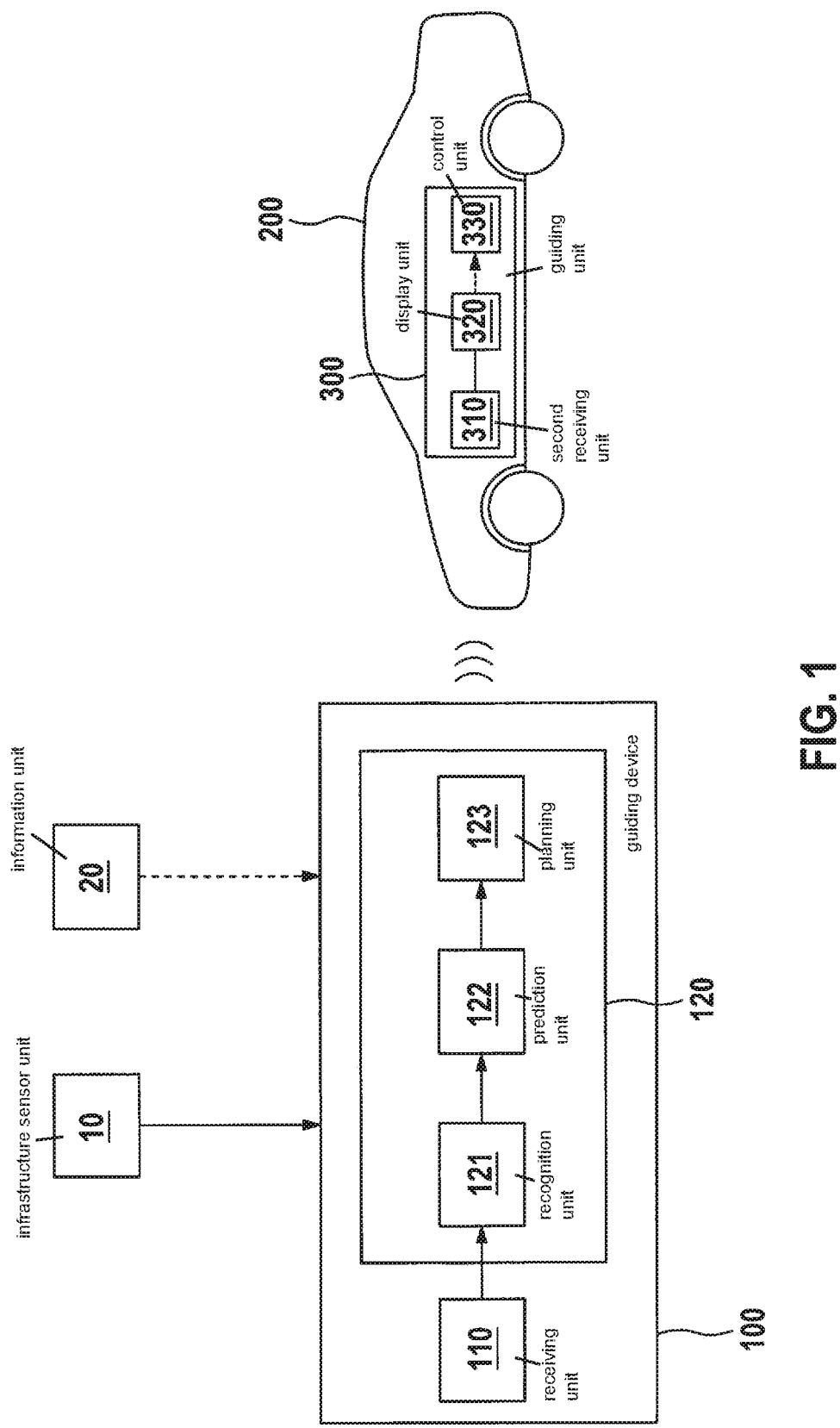
FIG. 1 shows a basic view of one specific embodiment of a provided guiding device and a provided guiding unit for guiding at least one vehicle

FIG. 1 shows a block diagram of a provided system having a guiding device 100 of a local surroundings for guiding a vehicle and a guiding unit 300, which is situated in a vehicle 200, for vehicle 200. An infrastructure sensor unit 10 may be apparent, for example, which acquires the local surroundings, for example, in the form of vehicles, pedestrians, bicyclists, animals, etc. Infrastructure sensor unit 10 may include, for example, cameras and/or other suitable sensors for monitoring public traffic routes.

The data acquired with the aid of infrastructure sensor unit 10 are supplied in a wired or preferably wireless manner to guiding device 100, which receives the data with the aid of a receiving unit 110. A low-latency real-time communication between infrastructure sensor unit 10 and local guiding device 100 and between guiding device 100 and vehicles 200 is implemented, the guiding device 100 being a with the aid of server-based guiding device 100. This is particularly significant if vehicles 200 are automated vehicles, in this case the most real-time capable communication possible being desirable to ensure an execution of the trajectories. The wireless communication between infrastructure sensor unit 10 and information unit 20 preferably takes place with the aid of a high-performance mobile radio technology, for example, 5G mobile radio, but may alternatively also be carried out using other technologies, for example, WLAN. It is advantageously possible using the provided method to optimize traffic flows, for example, to implement vehicles 200 being seamlessly incorporated into traffic gaps without previously stopping, which may minimize exhaust gas emissions, for example, in the form of $CO_2$, NOx, etc.

A typical sequence of the provided method for guiding at least one vehicle is described hereafter:

A vehicle owner of vehicle 200 registers with a service provider (not shown) to use the provided traffic management service. The type of vehicle 200 including its degree of automation (SAE level 0-5) and maximum/minimum velocity, acceleration and lateral acceleration, jerk limiting, etc., are preferably communicated. This may also be performed or changed during travel by inputs in vehicle 200 (for example, by means of user interfaces) as desired by the vehicle owner, for example, to adapt comfort levels of vehicle 200 (sporty, comfortable, etc.).

Vehicle 200 then transmits to guiding device 100 the destination and optionally the desired route to reach the destination.

Guiding device 100 may optionally have a connection to an information unit 20, to provide for example, current pieces of information on traffic density, weather conditions, road closures, construction sites, etc., which are transmitted in a wired or preferably wireless manner to guiding device 100 from information unit 20.

Guiding device 100 now plans the optimum route to the particular specified destination of all vehicles 200 which utilize the provided service. A digital map (not shown), which is required to locate the various objects, is situated in guiding device 100.

For this purpose, guiding device 100 acquires local surroundings and prepares a local surroundings model.

For this purpose, the guiding device 11 includes an ascertainment unit 120. The ascertainment unit 120 includes a recognition unit 121, with the aid of which a "static" surroundings model having infrastructure conditions of the surroundings, for example, buildings, traffic signs, bridges, etc. is prepared.

The behavior of all dynamic objects of the local surroundings is predicted with the aid of a prediction unit 122 functionally connected to recognition unit 121, whereby "paths" for the vehicles are ascertained, i.e., directions in which the vehicles have to move to reach their predetermined destinations.

The detailed trajectories of all dynamic objects of the local surroundings, in particular of vehicles 200, are planned with the aid of a planning unit 123 functionally connected to prediction unit 122 and the corresponding trajectory data are subsequently transmitted wirelessly to vehicle 200.

The mentioned data are received with the aid of a second receiving unit 310 situated in a guiding unit 300 of vehicle 200. Depending on the level of automation (level 0-5) of vehicle 200, the dynamic requirements are implemented by subordinate vehicle controllers (transverse, longitudinal controllers) or displayed to the driver on a display unit 320, for example, in the form of directional/acceleration requirements, for example, using arrows and/or colored (for example, red/green) bands in a combination display.

If vehicle 200 is an automated vehicle, a control unit 330 may optionally also be provided, which converts the proposed trajectory data into driving movements of vehicle 200.

Figure 2:
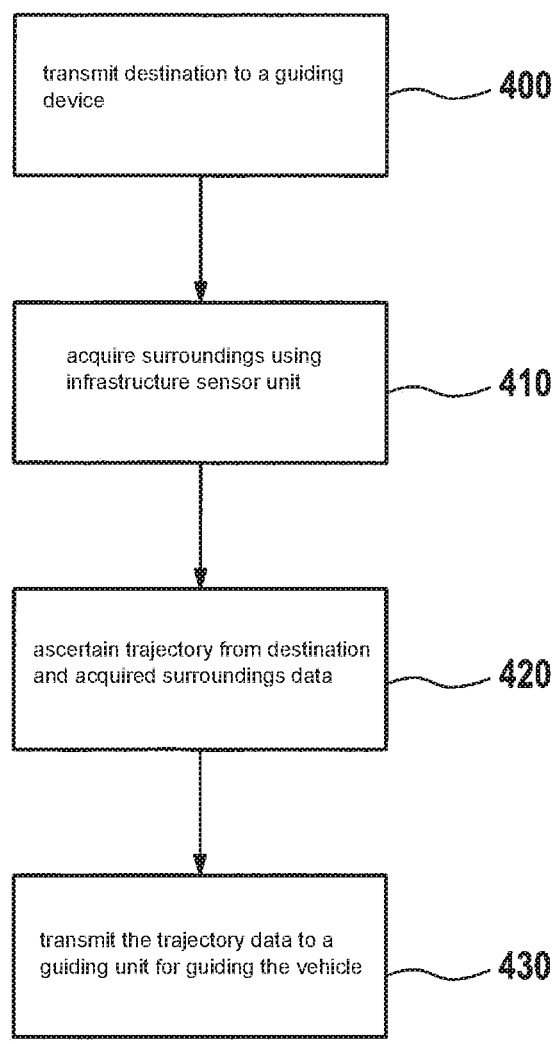
FIG. 2 shows a basic sequence of one specific embodiment of the provided method for guiding at least one vehicle.

FIG. 2 shows a basic sequence of a method for guiding at least one vehicle 200.

In a step 400, a transmission of a destination to a guiding device 100 is carried out.

In a step 410, an acquisition of a surroundings is carried out with the aid of an infrastructure sensor unit 10.

In a step 420, an ascertainment of a trajectory is carried out from the destination and the acquired surroundings data.

In a step 430, a transmission is carried out of the trajectory data to a guiding unit 300 for guiding the vehicle 200.

The process of ascertaining the surroundings model is advantageously carried out permanently by guiding device 100. The suitable trajectories for this vehicle 200 are only transmitted for the case in which a vehicle 200 registers for the provided service with guiding device 100. It is possible that the provided method is commercially utilized, so that interesting business uses may result for a service provider.

The method according to the present invention may advantageously be implemented as software, which runs, for example, on electronic guiding device 100 and electronic guiding unit 300. Simple adaptability of the method is supported in this way.

As a result, a safety level in road traffic may advantageously be made higher and a homogeneous traffic flow may be provided using the provided method.

Those skilled in the art will modify and/or combine the features of the present invention in a suitable way without deviating from the core of the present invention.

What is claimed is:

1. A guiding server comprising:
   a receiver; and
   a processor;
   wherein:
   the guiding server is configured to receive, via the receiver and from a static infrastructure object, sensor data obtained by a sensor of the infrastructure object;
   the guiding server is configured to receive, via the receiver and from each of a plurality of respective autonomous vehicles, a respective target destination of the respective autonomous vehicle;
   the processor is configured to determine a state of surroundings based on the sensor data;
   the processor is configured to ascertain respective trajectories for each of the plurality of respective autonomous vehicles in coordination with one another, the coordination of the ascertainment of the respective trajectories with one another being performed by the processor in a manner by which to minimize combined interruptions in drives of the plurality of respective autonomous vehicles along their respective trajectories, the coordinated ascertainment of the respective trajectories being based on the determined state of surroundings, on the received respective target destinations, and on estimated impacts of the drives along the respective trajectories on one another when the plurality of autonomous vehicles later perform the drives; and
   the guiding server is configured to control the plurality of respective autonomous vehicles to travel along the ascertained respective trajectories by wirelessly transmitting the ascertained respective trajectories to the plurality of respective autonomous vehicles.

2. The guiding server as recited in claim 1, wherein the processor is configured to predict movements of objects as part of the determination of the state of the surroundings.

3. The guiding server as recited in claim 1, wherein pieces of information about the surroundings are obtained by the guiding sever from an information unit and are used by the guiding server for the determination of the state of the surroundings.

4. A method comprising the following steps:
   a guiding server receiving, from each of a plurality of respective autonomous vehicles, a respective target destination of the respective autonomous vehicle;
   the guiding server acquiring, from a static infrastructure object, sensor data obtained by a sensor of the static infrastructure object;
   a processor of the guiding server determining a state of surroundings based on the sensor data;
   the processor ascertaining respective trajectories for each of the plurality of respective autonomous vehicles in coordination with one another, the coordination of the ascertainment of the respective trajectories with one another being performed by the processor in a manner by which to minimize combined interruptions in drives of the plurality of respective autonomous vehicles along their respective trajectories, the coordinated ascertainment of the respective trajectories being based on the received respective target destinations, on the determined state of surroundings, and on estimated impacts of the drives along the respective trajectories on one another when the plurality of autonomous vehicles later perform the drives; and
   the guiding server controlling the plurality of respective autonomous vehicles to travel along the ascertained respective trajectories by wirelessly transmitting the ascertained respective trajectories to the plurality of respective autonomous vehicles.

5. The method as recited in claim 4, wherein respective driving capabilities of the plurality of respective autonomous vehicles are obtained by the guiding server and are used by the guiding server for the coordinated ascertainment of the respective trajectories.

6. A non-transitory computer-readable medium on which are stored instructions that are executable by a processor of a guiding server and that, when executed by the processor of the guiding server, causes the processor of the guiding server to perform the a method, the method comprising:
   receiving, from each of a plurality of respective autonomous vehicles, a respective target destination of the respective autonomous vehicle;
   acquiring, from a static infrastructure object, sensor data obtained by a sensor of the static infrastructure object;
   determining a state of surroundings based on the sensor data;
   ascertaining respective trajectories for each of the plurality of respective autonomous vehicles in coordination with one another, the coordination of the ascertainment of the respective trajectories with one another being performed by the processor in a manner by which to minimize combined interruptions in drives of the plurality of respective autonomous vehicles along their respective trajectories, the coordinated ascertainment of the respective trajectories being based on the received respective target destinations, on the determined state of surroundings, and on estimated impacts of the drives along the respective trajectories on one another when the plurality of autonomous vehicles later perform the drives; and
   controlling the plurality of respective autonomous vehicles to travel along the ascertained respective trajectories by wirelessly transmitting the ascertained respective trajectories to the plurality of respective autonomous vehicles.

7. The guiding server as recited in claim 1, wherein the guiding server is configured to receive from the plurality of respective autonomous vehicles respective user-set drive comfort settings, and wherein the processor is configured to perform the ascertainment of the respective trajectories to maximize conformance of the travel by the plurality of respective autonomous vehicles to the user-set drive comfort settings.

* * * * *